United States Patent
Trees

[11] 4,124,113
[45] Nov. 7, 1978

[54] CASE INDEXER
[75] Inventor: Carl I. Trees, Moscow, Ohio
[73] Assignee: The Lodge & Shipley Company, Cincinnati, Ohio
[21] Appl. No.: 804,987
[22] Filed: Jun. 9, 1977
[51] Int. Cl.² ............................................. B65G 47/52
[52] U.S. Cl. .................................... 198/476; 198/461; 198/491; 198/576
[58] Field of Search ................ 198/459, 461, 462, 476, 198/482, 491, 575, 576, 688, 698

[56] References Cited

U.S. PATENT DOCUMENTS

| | | | |
|---|---|---|---|
| 1,924,146 | 8/1933 | Almgren | 198/459 |
| 2,547,729 | 4/1951 | Aiken | 198/459 |
| 2,646,869 | 7/1953 | Kay | 198/461 |
| 2,840,224 | 6/1958 | Lefief | 198/461 |
| 2,888,125 | 5/1959 | Engelson et al. | 198/461 |
| 2,912,092 | 11/1959 | Cross et al. | 198/461 |
| 3,053,025 | 9/1962 | Nigrelli et al. | 198/461 |
| 3,368,660 | 2/1968 | Standley et al. | 198/461 |
| 3,452,855 | 7/1969 | Baker et al. | 198/461 |
| 3,575,278 | 4/1971 | Hoffman et al. | 198/476 |
| 3,721,330 | 3/1973 | Crawford et al. | 198/461 |

FOREIGN PATENT DOCUMENTS 778,220   2/1968   Canada ...................................... 198/459

Primary Examiner—Evon C. Blunk
Assistant Examiner—Richard K. Thomson
Attorney, Agent, or Firm—Wood, Herron & Evans

[57] ABSTRACT

Apparatus for indexing cases into an uncaser or the like having a case conveyor with upstanding lugs which space the cases apart by a predetermined distance as the cases move in end-to-end abutting relation toward the uncaser. The indexer includes an endless chain having outwardly-projecting lugs spaced along its length a distance less than the length of each case. Each lug moves into the rear portion of a case as the case moves toward the case conveyor and swings the rear portion of the case to one side whereby the lug engages the leading wall of the next succeeding case and times the entry of the case onto the case conveyor.

4 Claims, 3 Drawing Figures

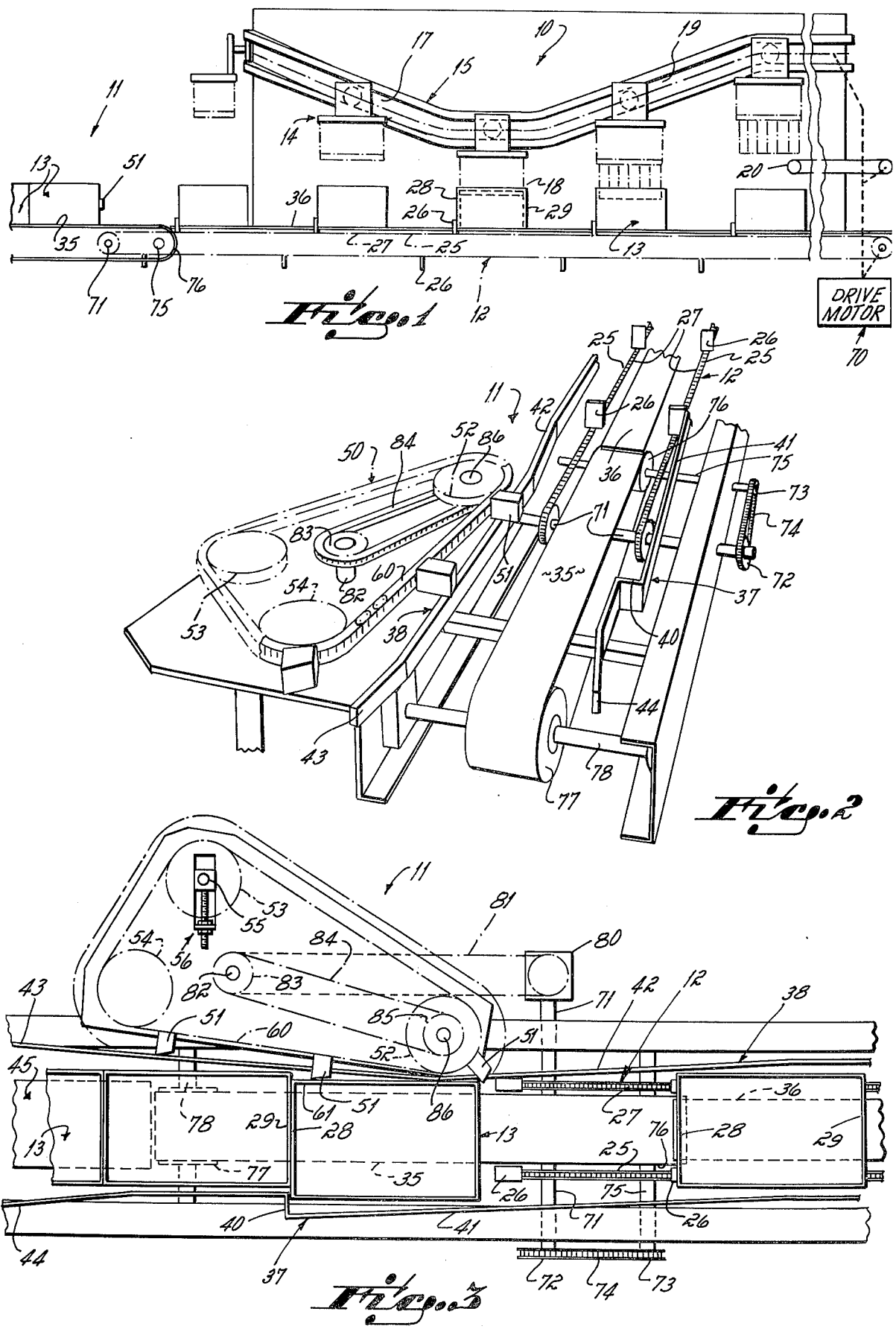

CASE INDEXER

This invention relates to a case indexer, that is, apparatus for timing the entrance of a case onto a case conveyor which has longitudinally-spaced lugs for determining the precise spacing of the cases with respect to each other.

The invention will be described in connection with the timing of the movement of cases into a continuous motion uncaser, although it will be understood that the indexer is suitable for other applications, as, for example, intermittent motion uncasers, case packers and the like.

The uncaser is apparatus for receiving cases filled with a pattern of articles, usually bottles, and lifting the articles out of the cases.

The uncaser has a case conveyor consisting of one or more chains which have spaced projecting lugs which determine the spacing of the cases relative to each other as they move through the uncaser. In the uncaser, lifting heads are spaced apart by the same distance as the lugs, the lugs serving to bring the cases into alignment underneath respective lifting heads so that the lifting heads can move into the cases, grasp the articles contained therein and lift them out of the case.

The cases are fed to the uncaser by a gravity or power feed conveyor, the cases being brought to the uncaser in end-to-end abutting relation. The function of the indexer is to separate the cases from their abutting relation and to feed them one at a time into the space between the upstanding lugs on the case conveyor. In one form of case conveyor, the cases are pushed by a fast-moving belt into engagement with the lugs of the case conveyor and thus conveyed through the uncaser. In another form of the case conveyor, the lugs engage the cases and push them through the uncaser. The indexer of the present invention is suitable for use with either type of case conveyor.

It has been the practice to provide case indexers wherein a mechanism strikes each case as it passes through the indexer in order to effect the desired spacing between the cases. This repeated striking of the cases, usually formed of corrugated paperboard, tends to injure the cases and reduces the life of the cases.

An objective of the present invention has been to provide an indexer which effects a gentle separation of the cases along with a timed feed of the cases onto the case conveyor.

Another objective of the invention has been to provide an indexer which is suitable for precisely feeding the cases into the case conveyor even under conditions of a random feed of cases in the indexer, that is, a feed wherein the cases are not necessarily in abutting relation.

The objectives of the invention are attained through the use of an endless chain lying in a horizontal plane adjacent the infeed of the cases. The chain has lugs spaced around its perimeter and adapted to project into the path of the incoming cases. The spacing between lugs is less than the length of each case. In operation, the lug will move gently against the rear portion of the case swinging it slightly to one side so that that lug moves into the path of the leading wall of the next succeeding case. The case, which is urged by an infeed belt against the lug, is restrained by the lug from passing onto the case conveyor until the precise time required for the case to move between two sets of spaced lugs on the case conveyor.

An advantage of the present invention is that one indexer chain is suitable for a range of lengths of cases. Further, a few changes in spacing on the lugs of the indexer will adapt the indexer for the handling of a range of cases from approximately 11 inches in length to 21 ½ inches in length.

The several objectives and features of the invention will become more readily apparent from the following detailed description taken in conjunction with the accompanying drawings in which:

FIG. 1 is a diagrammatic side-elevational view of the indexer and uncaser apparatus;

FIG. 2 is a perspective view of the indexer; and

FIG. 3 is a top plan view of the indexer.

In the drawings, an uncaser 10 is shown conjunction with the indexer 11 of the present invention. The uncaser has a case conveyor 12 conveying cases 13 under lifting heads 14 of the uncaser. The lifting heads are chain-driven in an endless path around the uncaser and ride in cam tracks 15 to cause them to move in a downward path indicated at 17 until each head projects into a case as shown in 18. Thereafter, conventional lifting devices raise the articles out of the case as the lifting heads move in an upward path indicated at 19. At the end of the operative portion of the uncaser cycle, each lifting head moves over a conveyor 20 and deposits the articles on the conveyor 20.

The case conveyor 12 is normally formed by two parallel endless chains 25 from which lugs 26 project. On the upper reach of the case conveyor, indicated at 27, the lugs 26 project upwardly and engage a trailing wall 28 of each case to move the case into precise vertical alignment with the lifting head as the lifting head moves through the operative portion of its cycle.

It should be understood that the invention is also suitable for use with a case conveyor wherein a fast-moving belt between the conveyor chains is in engagement with the bottom of a case and drives the leading wall 29 of each into engagement with the lugs, thereby positioning the case with respect to the lifting heads. The important feature of the indexer, in either situation, is to provide assurance that the cases 13 are moved onto the case conveyor in a position between adjacent upwardly projecting lugs 26.

The indexer 11 includes an infeed belt 35 which is in longitudinal alignment with the case conveyor 12 and located upstream of the case conveyor. A dead plate or slider bed 36 is located at the downstream end of the infeed belt 35, the slider bed being between the two chains of the case conveyor 12.

An outside guide rail 37 and an inside guide rail 38 are located alongside the infeed belt 35. The outside guide rail has an indentation 40 which permits the rear portion of the case to be swung slightly toward the rail 37, as will appear below. The rail 37 has, downstream of the indentation 40, a gradual angulated section 41 through which the section 41 guides the case from an angulated attitude back to an in-line orientation with respect to the case conveyor 12.

The rail 38 has a corresponding angulated portion 42 to guide the opposite side of the case. The upstream portion 43 of the rail 38 is angulated outwardly and cooperates with a similarly outwardly-angulated rail portion 44 of the rail 37 to funnel the cases into the case indexer. Between the rail portions 43 and 44 and at the upstream end of the infeed belt is an infeed conveyor 45 which may be gravity or power operated to bring cases 13 into the indexer in generally end-to-end abutment as shown in FIG. 3.

The indexer includes an endless chain 50 having lugs 51 uniformly spaced along its length. The chain lies in a generally horizontal plane and passes around a drive sprocket 52 and two idler sprockets 53, 54. The idler sprocket 53 is mounted on a laterally movable shaft 55 and has a mechanism 56 for adjusting the lateral position of the shaft to take up the tension on the chain and to permit chains of differing lengths and lug spacings to be easily mounted on the indexer to accommodate differing ranges of cases.

The lug spacing on the indexer chain 50 is less than the length of the cases which the indexer feeds onto the case conveyor. For example, the lug centers for differing case lengths may be as follows:

| Lug Centers | Case Lengths |
|---|---|
| 10 inches | 11 - 13½ inches |
| 12 inches | 13½ - 15½ inches |
| 14 inches | 15½ - 17½ inches |
| 16 inches | 17½ - 21½ inches |
| 20 inches | greater than 21½ inches |

The chain 50 has a reach 60 adjacent the infeed belt 35 which is generally parallel to the belt but slightly angulated toward it in the machine direction thereby to cause the lugs 51 to move gradually into engagement with the cases which are being carried through the indexer by the infeed belt 35. Each lug engages the rear portion 61 of each case 13 and swings the rear portion of the case into the indentation 40 of the rail 37. This movement brings each lug 51 into position in front of the leading wall 29 of the next succeeding case. The infeed belt 35 which is being driven at a linear speed greater than that of the chain 50 urges each case 13 into engagement with the lug. The lug impedes the movement of the case to the case conveyor 12. The lugs on the chain 50 are timed to the lugs on the case conveyor so that each lug 51 swings around the downstream sprocket 52 and out of the path of the case when the position of the lugs 26 in the case conveyor is such as to permit the case to move beyond the chain 50 into a position above the case conveyor 12.

The system is driven from a common drive motor indicated at 70 in FIG. 1 which drives the case conveyor 12. The case conveyor 12 passes around sprockets on a shaft 71 at the upstream end. On one side of the shaft 71 is a large sprocket 72 which is connected to a small sprocket 73 by a chain 74. The sprocket 73 is fixed to a shaft 75 which carries a pulley 76 to drive the infeed belt 35. The other end of the belt 35 passes around a pulley 77 mounted on a shaft 78.

The opposite end of the shaft 71 is connected through a right angle transmission 80 and a chain 81 to a shaft 82. The shaft 82 carries a sprocket 83 which drives a chain 84 passing around a sprocket 85 on a shaft 86. The shaft 86 is fixed to the drive sprocket 52 for the indexer chain.

Through this drive system, it can be seen that all moving elements are tied directly to the drive for the conveyor chain so that once the elements are correctly positioned, referring particularly to the position of the indexer lugs 51 with respect to the case conveyor lugs 26, the cases will always move into the case conveyor 12 in properly timed relationship.

In the operation of the invention the cases are fed toward the indexer on the infeed conveyor 45. As each case moves into the indexer, it is carried by the infeed belt 35 toward the case conveyor 12. As the rear portion of each case 13 passes the indentation 40 in the rail 37, the lug 51 moves the rear portion 61 of the case into the indentation, thereby bringing the lug 51 into a position ahead of the trailing wall 29 of the next succeeding case. As a case is released from the indexer onto the case conveyor 12, the infeed belt 35 moves the next case into position against the lug 51. There the case moves at the lineal speed of the lug 51 toward the case conveyor. As the lug 51 swings around the sprocket 52, the case is released to be driven rapidly onto the case conveyor 12 until it comes to rest on the slider bed 36. The case rests on the slider bed 36 very briefly until the lugs 26 of the case conveyor swing up around their upstream sprockets to a position of engagement with the trailing wall 28 of the case. Thereafter, the case conveyor moves the case into operative relation with the uncaser.

Having described my invention, I claim:

1. Apparatus for indexing cases onto an endless case conveyor having spaced lugs defining the location on the case on the conveyor,
   means continuously urging a line of incoming cases toward said case conveyor in end-to-end abutting relation,
   an endless indexing chain lying in a horizontal plane adjacent the upstream end of said conveyor,
   spaced lugs projecting laterally outwardly from said chain and into the path of said incoming cases,
   said lugs being spaced from each other a distance less than the length of a case,
   each lug engaging the trailing side portion of a case to push said trailing portion laterally and thereby positioning said lug ahead of the front wall of the next succeeding case,
   said indexing chain having a reach extending generally parallel to said line of cases but being angulated slightly toward said line of cases from its upstream end to its downstream end, whereby said indexing lugs gradually swing the rear end portion of each case laterally with respect to said line of cases,
   at least one guide rail spaced from said indexing chain a distance sufficient to permit a case to pass between said chain and said rail,
   said rail having an outwardly-extending indentation therein to permit the trailing end portion of a case to be swung into said indentation when it is engaged by a lug on said indexing chain, said rail having an angulated section downstream from said indentation to guide each case back to an in-line orientation,
   the movement of said chain lugs being timed to the movement of said conveyor lugs to release a case into the space between lugs on said case conveyor.

2. Apparatus as in claim 1 in which said case-urging means comprises,
   an infeed belt at the upstream end of said case conveyor and adjacent said indexing chain, said belt being engageable with said cases,
   means driving said belt at a faster lineal speed than said indexing chain to force the leading walls of the cases against the lugs of said indexing chain.

3. Apparatus as in claim 2 wherein said case conveyor comprises two laterally spaced endless chains each having lugs projecting therefrom,
   said belt passing between said conveyor chains at the upstream end portion of said conveyor to carry cases past the upstream end of said conveyor to a position permitting chain lugs to engage said cases.
4. Apparatus according to claim 1 further comprising, three triangularly spaced sprockets supporting said indexer chain,
the location of one of said sprockets being adjustable to permit indexer chains of differing lengths to be mounted on said sprockets thereby to permit a range of case lengths to be indexed onto said case conveyor.

* * * * *